United States Patent
Hallemeier

[19]

[11] Patent Number: 5,889,900

[45] Date of Patent: Mar. 30, 1999

[54] INTEGRATED OPTIC TUNABLE FILTERS AND THEIR METHODS OF FABRICATION AND USE

[75] Inventor: Peter F. Hallemeier, Brookline, Mass.

[73] Assignee: Ramar Corporation, Northborough, Mass.

[21] Appl. No.: 857,633

[22] Filed: May 16, 1997

[51] Int. Cl.[6] .............................. G02B 6/00; H04J 14/06
[52] U.S. Cl. .................................. 385/11; 385/3; 385/14; 385/24; 385/27; 385/31; 359/115; 359/122
[58] Field of Search ................................ 385/1, 2, 3, 11, 385/14, 24, 27, 28, 31, 39, 38, 141; 359/115, 122, 127

[56] References Cited

U.S. PATENT DOCUMENTS

| | | | |
|---|---|---|---|
| 4,197,008 | 4/1980 | Pinnow et al. | 356/350 |
| 4,223,977 | 9/1980 | Papuchon et al. | 385/11 X |
| 4,390,236 | 6/1983 | Alferness | 385/11 X |
| 4,606,605 | 8/1986 | Ashkin et al. | 385/11 X |
| 4,966,431 | 10/1990 | Heismann | 385/11 X |
| 5,002,355 | 3/1991 | Caron | 385/15 X |
| 5,015,053 | 5/1991 | Johnson | 385/3 X |
| 5,117,469 | 5/1992 | Cheung et al. | 385/11 |
| 5,133,028 | 7/1992 | Okayama et al. | 385/11 |
| 5,218,653 | 6/1993 | Johnson et al. | 385/11 |
| 5,455,877 | 10/1995 | Baran et al. | 385/11 |
| 5,471,545 | 11/1995 | Negami et al. | 385/1 |
| 5,526,439 | 6/1996 | Bergmann | 385/24 |
| 5,652,809 | 7/1997 | Aronson | 385/7 |
| 5,796,882 | 8/1998 | Schmid | 385/11 |

*Primary Examiner*—Brian Healy
*Attorney, Agent, or Firm*—Francis J. Caufield

[57] ABSTRACT

Integrated optic tunable filters (IOTF) which for operation in many different wavelength ranges with different spectral properties. The IOTFs have one or more stages and/or channels formed in birefringent substrates and operate via polarization interferometric effects. Manufacture is via the use of variants of well-known processes used for making high speed integrated optic modulators. The IOTFs are for use in fiber-optic systems, although they can also be implemented in optic systems which are not fiber-optic. Other applications include wavelength division multiplexing, spectral analysis, and source output conditioning. Filtering may be active through the use of externally applied heat, stress, or electric fields.

106 Claims, 7 Drawing Sheets

INTEGRATED OPTIC TUNABLE FILTERS AND THEIR METHODS OF FABRICATION AND USE

BACKGROUND OF THE INVENTION

This invention generally relates to the field of optical filtering and in particular to the field of integrated optic filters, their method of fabrication, and use in such applications as wavelength division multiplexing, beam conditioning, and spectral analysis.

Optical filters, whether passive or actively tunable, are well-known for their uses in controlling the amplitude and spectral content of radiant sources, spectral analysis, switching, modulation, and wavelength selection capability, especially as applied to wavelength division multiplexing in the field of communications where fine wavelength resolution produces high channel density.

A number of different technological approaches have been used in the design and implementation of optical filters to provide the required functionality for the above applications. Among these approaches have been those based on tunable liquid crystals (LCTF), tunable acousto-optics (AOTF), unbalanced Mach-Zender interferometry, reflective waveguide arrays, and many types of etalons.

The underlying principle behind the operation of some optical filters is multi-beam optical interference. Here, the optical path length of the individual light beams in the device is varied, after which the beams are interfered. Since the effective path length is wavelength dependent, it follows that the interference is wavelength dependent, which yields a wavelength dependent optical response. High quality filters based on this technology generate large optical path length differences, while maintaining fine control over them, and precise control of the interference points. For tunable filters, the effective path length must be adjustable through some external excitation.

Even though there are any number of devices that rely on interference phenomena, there is a substantial range in the techniques by which these interference effects are achieved. One of these is described in U.S. Pat. No. 5,353,317 to Weber which shows a massively parallel version of a Mach-Zender type filter where the paths are all separate waveguides. Another is shown in U.S. Pat. No. 5,526,439 to Bergman which uses couplers to interfere beams. Another coupler based tunable filter is shown in U.S. Pat. No. 4,390,236 to Alferness which describes an integrated optic device based on polarization rotation.

Other optical filters rely on polarization effects to achieve selective tunability. For example, U.S. Pat. No. 4,197,008 describes device in which spatially varying electric fields are applied to successive regions of a bulk optic crystalline medium disposed between a pair of suitably oriented polarizers to achieve filtering capability. U.S. Pat. Nos. 5,015,053, 5,002,355, and 4,223,977 all make use of two polarization guides and different methods of exciting them.

While there have been a variety of approaches to optical filtering that have been more or less successfully used in the past, there continues to be a strong demand, driven in large part by the requirements of the telecommunications industry, for tunable optical filters that can be easily fabricated and operated, and it is a primary object of this invention to satisfy the need for such devices.

It is another object of the invention to provide tunable optical filters in integrated optic format.

It is yet another object of the invention to provide tunable optical filters of small scale yet with fine control and coarse control over path lengths.

It is still another object of the present invention to provide tunable optical filters for use in telecommunications, beam control, and spectrometry applications.

Other objects of the invention will in part be obvious and will in part appear hereinafter in the detailed description to follow when read in conjunction with the drawings.

SUMMARY OF THE INVENTION

The present invention relates primarily to tunable optical filters whose operation is based on polarization interference effects achievable in integrated optic formats and hence may be referred to as integrated optic tunable filters (IOTFs). The devices, while preferably actively tunable may also exist in passive form. The disclosed devices can be designed for operation in many different wavelength ranges and spectral properties can easily be customized. They are manufacturable using the same technology as high speed integrated optic modulators, but with the addition of novel innovations. Their primary use is in fiber-optic systems, although they can also be implemented in optic systems which are not fiber-optic. The technology is readily adaptable, allowing quick customization of filters for many applications. The invention allows continuous, active filtering of optical wavelengths in an optical system or transmission link. The technology allows the construction of very high performance, tunable, optical filters.

In its basic configuration, the invention is an integrated optic wavelength selective filter which comprises a substrate formed of a birefringent material that is preferably optically active in that its optical properties may be changed in response to external stimuli such as electric fields, heat, and mechanical stress.

At least one waveguide is formed in the substrate with an input end and an output end. The waveguide has a predetermined length and geometry and is structured to support at least two orthogonally polarized modes of propagation along the predetermined length such that the spatial energy profiles of the orthogonally polarized modes of propagation are substantially identical as they exit the output end. The waveguide is formed in the substrate along an axis thereof such that the orthogonally polarized modes of propagation experience different effective indices of refraction, and thus rates of change, as they propagate along the waveguide.

Input polarizer means, preferably linear polarizers, are positioned upstream of the input end of the waveguide with its axis of polarization at a predetermined angular orientation with respect to the waveguide.

Output polarizer means, also preferably a linear polarizer, are positioned downstream of the output end of the waveguide with its axis of polarization at a predetermined angular orientation with respect to that of said input polarizer means.

Means for coupling an input signal containing a plurality of wavelengths into said waveguide through said input polarizer means are provided so that the input signal is analyzed into polarized components corresponding to the orthogonal modes of propagation and propagate along the waveguide such that each wavelength of the input experiences a different phase change as it travel along the waveguide. The predetermined length of the waveguide is selected so that the phase relationship between predetermined wavelengths of the orthogonally polarized modes of propagation, within a given bandwidth, constructively interfere with one another along the axis of the output polarizer means so that they are transmitted thereby for subsequent downstream use while all other wavelengths destructively interfere through absorption so that they are rejected from subsequent downstream use.

More complex versions include multiple stages to achieve high resolution, multiple waveguides for parallel channel capability, and high speed tunability via electro-optic effects. The devices may be used in communication architectures in conjunction with trunk lines, signal splitters, non-dispersive taps to perform wavelength division multiplexing, switching, and modulation functions. Beam control of source radiant outputs is another application along with their use in spectrometry.

While the substrate may be formed of any suitable optically active material, the use of optically active birefringent uniaxial crystals such as lithium niobate and lithium tantalate are preferred along with associated photolithographic and process techniques for forming the waveguides and electrode patterns.

Related methods of fabrication and methodologies for optically filtering are also described.

BRIEF DESCRIPTION OF THE DRAWINGS

The structure, operation, and methodology of the invention, together with other objects and advantages thereof, may best be understood by reading the detailed description in connection with the drawings in which unique reference numerals have been used throughout for each part and wherein.

DETAILED DESCRIPTION OF THE INVENTION

The present invention relates to tunable filters in integrated optic format, their methods of fabrication, operation, and application. Embodiments range from basic versions involving single stage filters tunable by length and/or external excitations to more complex multistage versions, which can also exist in multichannel configurations for massive parallel processing. As will be seen, applications include, but are not limited to, communications multiplexing, switching, spectral analysis, and source beam conditioning.

Figure 1:
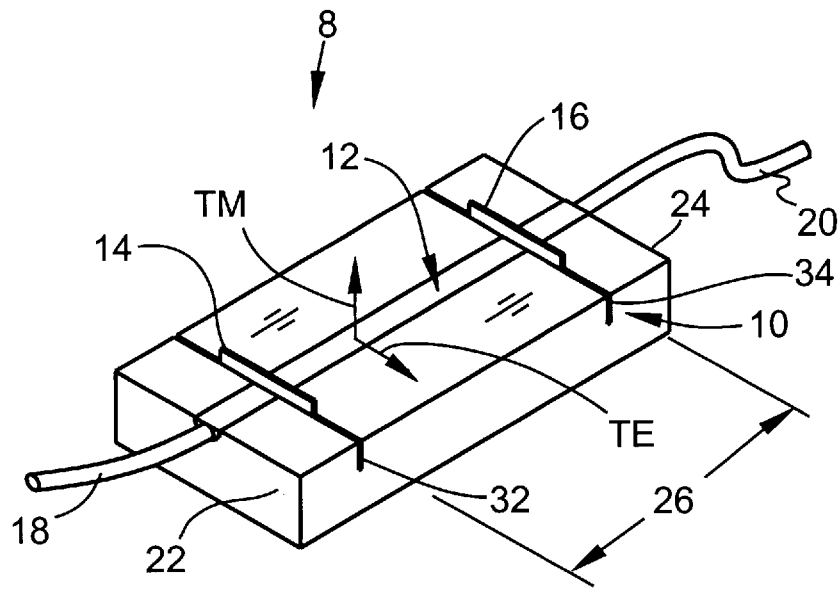
FIG. 1 is a diagrammatic perspective view of a basic single stage embodiment of the invention which is tunable via length adjustment.

Reference is now made to FIG. 1, which shows a basic embodiment of the invention. Here, a single stage filter tunable via length adjustment is designated at 8. As will be appreciated, filter 8 is a guided optical wave, wavelength selective filter. Filter 8 is composed of a substrate 10 in which an optical waveguide 12 is formed in a manner to be described, an input polarizer 14 and an output polarizer 16 which are inserted into or on top of the surface of the substrate 10 normal and intersecting optical waveguide 12. An input optical fiber 18 and output optical fiber 20 are coupled, respectively, to an entrance facet 22 and the exit facet 24 of optical waveguide 12.

Substrate 10 may be formed of any suitable material that can support the fabrication of the optical waveguide 12. Waveguide 12 is expediently fabricated by one of two methods. The first method comprising depositing a material such as a metal on the surface of the substrate, delineating the waveguide pattern using standard lithography techniques, followed by raising the temperature of substrate 10 to cause an in-diffusion process after which the material on the surface is diffused into the substrate causing a local increase in its optical index of refraction to form the waveguiding region. Alternatively, the delineation of the surface of substrate 10 is done using photolithographic techniques followed by exposure to a solution which exchanges certain atoms in substrate 10 with atoms in a solution causing the index in the delineated regions to be increased thereby creating the waveguide 12. Some combination of the two foregoing techniques may also be sensibly used to form waveguide 12.

Further, waveguide 12 is fabricated to support two orthogonal polarization modes in the operating wavelength range. As is well-known, these modes are termed the Transverse Electric (TE) and Transverse Magnetic TM) modes which are set, respectively, to be parallel and perpendicular to the substrate surface. The electric field mode profiles of the TE and TM modes must be sufficiently similar so the spatial overlap, defined by the overlap integral of the spatial field distributions, is optimized. To achieve this, those skilled in the art may select from among known processes with temperatures and times, material layer thickness, exchange solutions and gases. Lithium niobate and lithium tantalate are preferred substrate materials for both processes. Titanium metal in-diffusion and/or benzoic acid (proton or hydrogen) exchange are standard waveguide fabrication processes that may readily be employed. Other substrate materials include soda lime glass with the waveguide formed via an exchange process using potassium or cesium ion solutions.

A standard in-diffusion process is to deposit 800–1500 angstroms of titanium onto the surface of an x-cut lithium niobate crystal and heat to an in-diffusion temperature of 900–1200 C. for a duration of 8–12 hours. A standard ion exchange process is to expose the substrate to a benzoic acid melt at 200–300 C. for 10–60 minutes and postbake at 300–400 C. for 2–8 hours.

Substrate 10 and waveguide 12 must also exhibit birefringence, defined as the difference in index experienced by the propagating TE and TM modes. The birefringence is introduced by choosing the substrate material optical axis orientation with respect to the propagation direction of waveguide 12. Uniaxial or biaxial crystals may be used in this connection. In a preferred method, lithium niobate is used where the substrate surface is cut normal to the x or z-axis of the crystal. Here, the waveguide, or more than one as will be seen, is fabricated in the plane of the x- or z-axis and is delineated along the y-axis. The optical waves traveling along the waveguide in the y-direction, see the two orthogonal polarization mode indices in the x and z-axis for TM and TE polarizations, respectively.

Birefringence can also be introduced into a substrate material which is not intrinsically birefringent by the process during which the waveguide is fabricated. An example of this is using soda lime glass, which is not birefringent, in an ion exchange with potassium or cesium. A standard ion exchange process is to expose the substrate to a potassium hydroxide solution at 200–300 C. for 10–60 minutes and postbake at 300–400 C. for 2–8 hours. The induced stress of the exchanged ions causes the index in one substrate plane to be different from the other.

Polarizers 14 and 16 are introduced into the propagation path of the waveguide 12 at a precise, predetermined distance interval 26. Polarizers 14 and 16 are preferably linear, meaning only the electric field component of the light wave parallel to the linear transmission axis of the polarizing medium is transmitted. The transmission axis of each polarizer 14 and 16 is placed at a predetermined angle to the two orthogonal polarization mode directions of waveguide 12. The polarizing area of each polarizer 14 and 16 must overlap the cross sectional area of waveguide 12 so all light in waveguide 12 encounters the polarizing effect during beam propagation. Each polarizer may be mounted in slightly off-axis directions by one or two degrees to reduce interference effects due to surface reflections. The polarizing power or extinction of polarizers 14 and 16, defined as the power transmitted parallel to the transmission axis divided by the power transmitted along the axis ninety degrees to the transmission axis, should exceed 100 to 1. Device performance improves with higher extinction polarizers.

The first method of incorporating polarizers is to insert them as a thin sheet polarizer perpendicular to the surface of substrate 10. Precisely spaced cuts 32 and 34 are made into the surface of substrate 10 so that they have high optical quality edges and are deeper than the penetration of the waveguide. This may be done with a precision diamond cutter. The sheet polarizer is oriented with the polarization transmission axis at the desired angle to the waveguide propagation modes and bonded with index matching adhesive. The thin sheet polarizer is of a commercially available type chosen for the operating spectral range of the device, made from doped and stretched PVA or of metal oriented, doped glass. Manufacturers include Nitto Denko of Japan, Polaroid, Sumitomo Electric, and Corning. The polarizer thickness must be on the order of the Rayleigh range of the waveguide, usually 25 to 250 micrometers.

Figure 2:
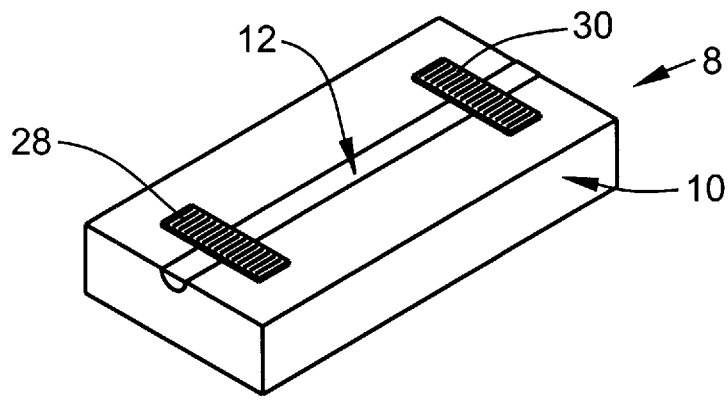
FIG. 2 is a diagrammatic perspective view of one embodiment of the invention illustrating placement of its polarizers.

Referring to FIG. 2, a second method for incorporating polarizers in the device is to use the well-known thin film plasmon polarizers such as those designated at 28 and 30. This type of polarizer is fabricated on the surface of filter 8 by depositing a precisely controlled thin dielectric film of known dielectric constant after which a conductor, such as a metal, is deposited on top the dielectric film. With proper selection of the dielectric film thickness, the TM component of the electric field of the optical wave in the waveguide interacts with the conducting film and becomes attenuated. The TE component passes unaffected. To control the angle between the two polarization modes and the polarizer, substrate 10 and waveguide 12 must be oriented at the desired angle to the surface of the crystal where the polarizer is deposited. A preferred polarizer configuration uses silicon nitrate of thickness 200–500 Angstroms, overlaid with aluminum of thickness 1000 Angstroms. Since the polarizing axis is always in the plane of substrate 10, the crystal axes are suitably oriented to adjust the angle of the two modes relative to the polarizer.

A third method is to use polarizing fibers, or polarization maintaining fibers, at the input and output of filter 8 with their polarizing axis correctly oriented to the crystal cut of waveguide 12. The input light from the source to be filtered is coupled to the filter 8 through an optical fiber which is butt coupled to the input facet of the substrate. The fiber is normally assembled into a carrier made from micromachined silicon v-grooves or glass capillaries, and polished to optical quality on the end face. The input facet of the substrate is cut and polished to optical quality using standard optical polishing techniques. The fiber is then aligned to the waveguide in the substrate and bonded with adhesive. These techniques are well-known to individuals skilled in the art of integrated optics. The same technique is then used to join the output fiber. In this connection, fibers 18 and 20 can be standard single mode, multi-mode, polarization maintaining, or polarizing type fibers.

Operation of the invention will be understood from the following. The fundamental effect which causes the filtering properties of the device is two beam polarization interference. The effective optical path lengths seen by the individual light beams in the device are dissimilar, due to the birefringence or difference in effective optical indices, after which the beams are interfered using a polarizer. Because the effective path length is wavelength dependent, it follows that the interference is also wavelength dependent, which yields a wavelength dependent optical response. Narrow bandwidth filters have large optical path length differences while maintaining fine control over them through precision control of the interference points and the interference effect. For tunable filters, the effective path length difference, as will be seen, is controllable through some external excitation.

Now, consider light entering filter 8 through input fiber 18. The light couples into waveguide 12 and is broken into TE and TM components, respectively. After encountering the first polarizer 14, they are described by the two waves given by the following equations for TE and TM modes, respectively:

$$E_1 = A_1 e^{j\phi_1}$$

$$E_2 = A_2 e^{j\phi_2}$$

where, $$\phi = kx = \frac{2\pi n x}{\lambda}$$

and the time dependence of the wave is assumed to be sinusoidal, and the A's denote the electric field amplitude of the optical wave. The waves then propagate down the waveguide 12 a distance 26 where they encounter the second polarizer 16. The mixing effect occurs just beyond the second polarizer 16. The fields are now given by:

$$E_3 = A_1 e^{j\phi_1} \cos\theta$$

$$E_4 = A_2 e^{j\phi_2} \sin\theta$$

The intensity is the sum of the two waves multiplied by the conjugate of the sum as given by:

$$I = E_3 + E_4 * \text{conj}(E_3 + E_4)$$

Here, the assumption has been that the overlap of the field power distributions of the two polarizations is substantially perfect. A correction term can be added later, which is calculated from the spatial overlap integral of the two modes. The intensity is now given by:

$$I(\delta,\theta) = E_1^2 \cos^2\theta + E_2^2 \sin^2\theta + E_1 E_2 \cos\theta \sin\theta 2 \cos^2\delta$$

with the phase difference δ given by:

$$\delta = \phi_1 - \phi_2 = \frac{2\pi d}{\lambda}(n_{TE} - n_{TM}) = \frac{2\pi d}{\lambda} \Delta n$$

With the angle θ of polarizer chosen as 45 degrees, we see the intensity relation as a function of wavelength becomes:

$$T(\lambda) = I_0 \cos^2\left(\frac{\pi \Delta n d}{\lambda}\right)$$

which will be used for explanation purposes.

Figure 3:
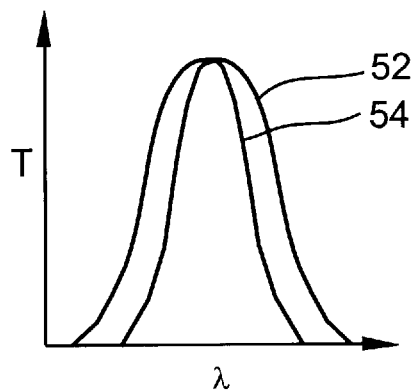
FIG. 3 is a graph of the filter characteristics of the embodiment of FIG. 1 indicating the effect of a difference in length adjustment on its pass band.

FIG. 3 shows the intensity distribution as a function of wavelength for two different stage lengths 26. The spectral response function T(λ) is a function of the birefringence, the stage length 26 and the wavelength, λ. Choosing the substrate material and orientation for birefringence value, the positions of polarizer 14 and 16 allows the selection of the spectral characteristics for the wavelength region of interest. This is demonstrated in FIG. 3 which shows the spectral response for two filters of different length. Here, curve 52 has a stage length shorter than that for curve 54.

It can be shown that the full width at half maximum (FWHM) is approximately given by:

$$FWHM = \frac{2\Delta n d}{\lambda_0^2}$$

and the Q factor of the filter, a wavelength independent figure of merit is given by:

$$Q = \frac{FWHM}{\lambda_0}$$

Other figures of merit are the free spectral range, the wavelength change between successive transmission peaks, and the out-of-branch rejection, or ratio of maximum transmission to minimum transmission in wavelength.

By using a material for the substrate that can have its birefringence changed in response to the application of an externally applied excitation or perturbation, the effective optical path difference can be selectively changed with the applied excitation to tune the filter. An excitation applied to change the birefringence or length for T(λ) changes the filter wavelength response. Some well-known forms of excitation include the application of heat, stress and electric fields to the substrate in the waveguide region. In lithium niobate or lithium tantalate, both preferred materials, heat, acoustic waves and electric fields can induce large birefringence changes.

Figure 4:
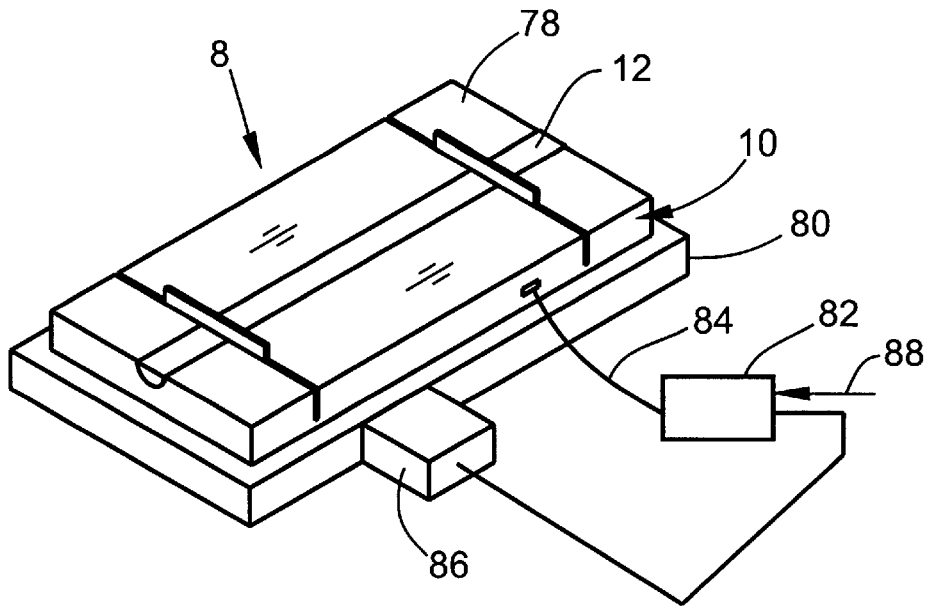
FIG. 4 is a diagrammatic perspective view of an embodiment of the invention that is thermally controlled.

In temperature tuning, the birefringence of substrate 10 and/or waveguide 12 varies with temperature. Normally, the birefringence increases with higher temperature. Referring to FIG. 4, filter 8 is shown mounted on a high thermal mass base plate 80 made of a material such as aluminum or copper. A thermocouple 84, which monitors the temperature of substrate 10, is thermally coupled to filter 8 and fed into a controller 82. Also mounted on base plate 80 is a thermo-electric heater or cooler 86, which is connected to the controller 82. The controller 82 also contains a set mechanism 88 for the user to tune filter 8. The feedback controller 82 then maintains the constant temperature and spectral response of filter 8. The same techniques are used to spectrally tune distributed feedback laser diodes (DFB). Temperature stability of $10^{-2}$ degrees C. is routinely achievable. Anisotropic temperature-optical coefficients are readily found in numerous optical material handbooks.

Figure 5:
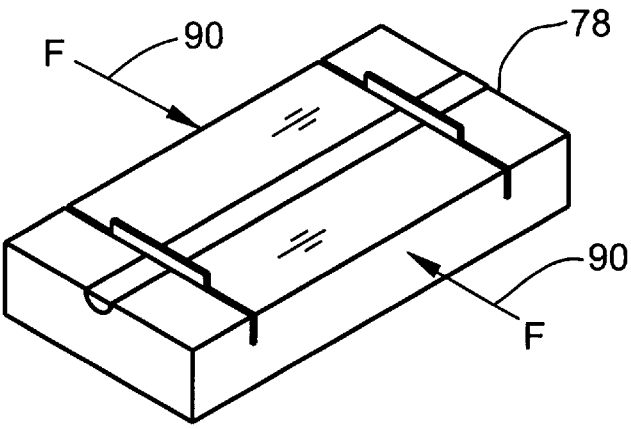
FIG. 5 is a diagrammatic perspective view of an embodiment of the invention that is controlled via the application of mechanical stress.
Figure 6:
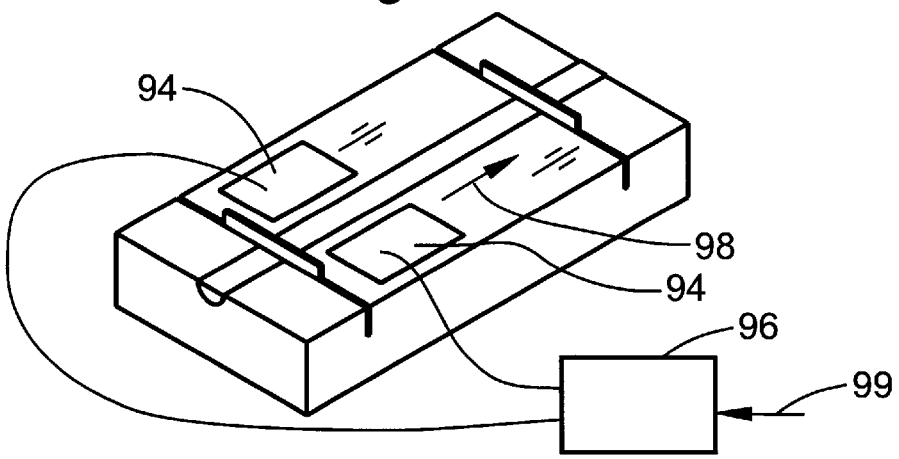
FIG. 6 is a diagrammatic perspective view of an embodiment of the invention that is controlled via the application of an acoustic wave.

In stress tuning, the birefringence of the substrate 10 and/or waveguide 12 changes due to the physical compression of the atoms of the substrate. The stress can be applied by a compressive force 90 as shown in FIG. 5, or through the application of an acoustic wave 98 through substrate 10 generated by a transducer 94 that is connected to a frequency generator 96 as seen in FIG. 6. Through input 99 to the signal generator, the user adjusts the amplitude and frequency of the acoustic waves. The anisotropic acousto-optical coefficients are readily found in numerous optical material handbooks.

Figure 7:
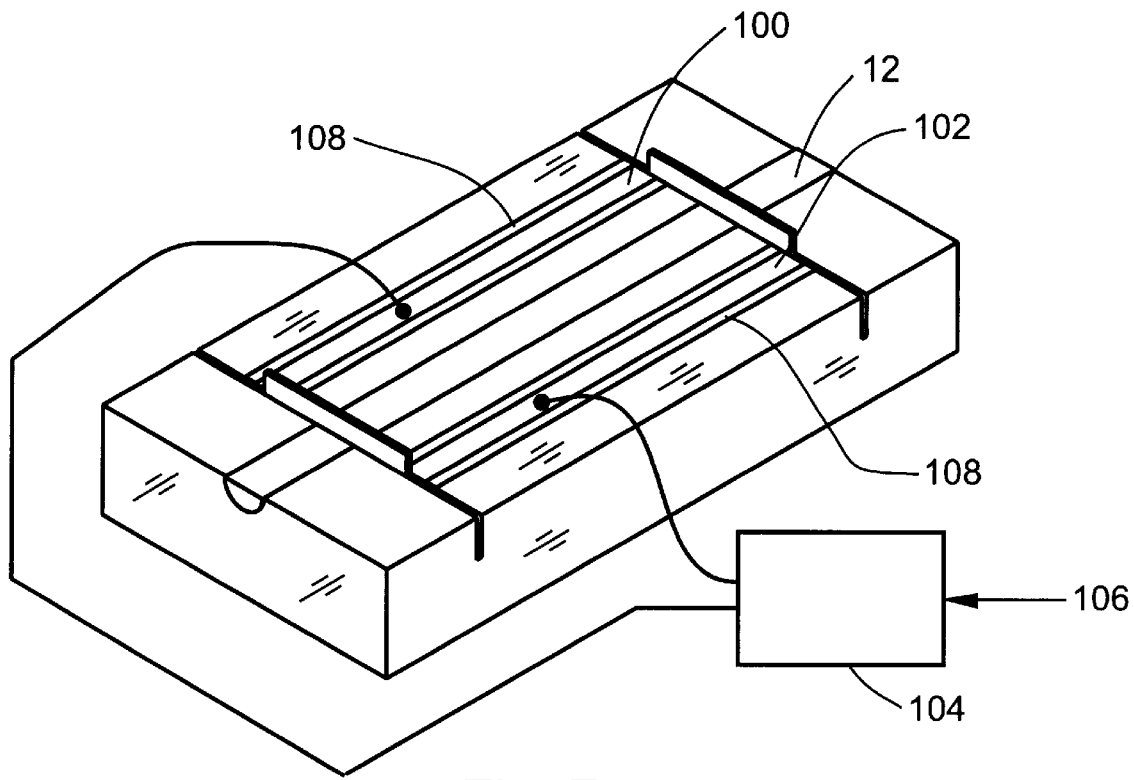
FIG. 7 is a diagrammatic perspective view of an embodiment of the invention that is controlled via the application of an electric field.

In electric field tuning, the birefringence is changed through the application of an electric field in the waveguide region of the invention. The electro-optic effect is well-known and widely exploited in the field of integrated optic modulation devices. Referring to FIG. 7, a two pole metallization 100, 102 is deposited close to the waveguide using standard sputtering or evaporation techniques—the exact location depending on which component of the electro-optic tensor is to be used. When the two poles are connected to a voltage source, an electric field is generated between the electrodes. This field induces the desired birefringence change and varies in accordance with applied voltage set by the user, as at 106. For high speed operation, a second dielectric layer 108 may be deposited prior to the metallization 100, 102 to aid in velocity matching to the electrode structure. Those skilled in the art will be able to optimize the structure for high speed operation. The anisotropic electro-optical coefficients are readily found in numerous optical materials handbooks. A typical birefringence response for a standard 12 μelectrode gap, is Δn(E)=1.5E−5/Volt. Application of 10 volts across the electrodes of 2 cm long stages, causes a retardance change of 2 cm*1.5E−5*10=3 μ, enough to tune 2 nm at the operating wavelength of 1550 nm, more at shorter wavelengths. Standard applied voltages on lithium niobate devices are in the range of ±25 volts, which yields an electrical tuning range of 25 nm for a 0.3 nm filter. Lithium niobate modulators are routinely manufactured with bandwidths of 10 GHz. The same switching speeds are achievable with the inventive IOTF.

Figure 8:
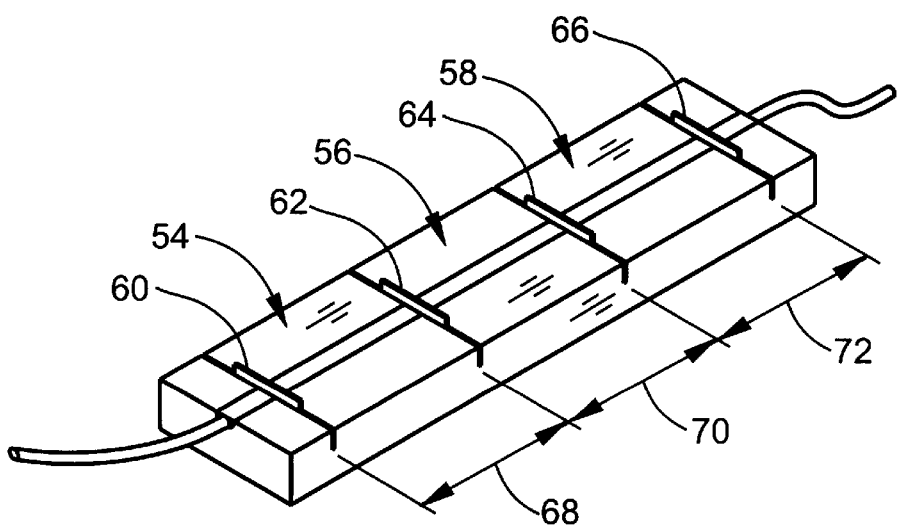
FIG. 8 is a diagrammatic perspective view of a multistage embodiment of the invention whose initial band pass is set via the length of its various stages and is thereafter tunable via the use of applied electric fields.

Beyond the basic structure and organization of the invention discussed above, there are more complex embodiments whose properties can be adopted to particular applications requiring higher precision and control and/or more channel capacity. The basic invention can be cascaded either monolithically on the same substrate or through the use of serial or in-line coupling of individual stages. These multistage embodiments are fabricated in the same manner as the single stage device. FIG. 8 shows an extension of the embodiment shown in FIGS. 1 and 2, with a plurality of filter sections 54, 56, and 58 cascaded in-line. Each section 54, 56, 58 is termed a stage and has the properties of the device in FIG. 1. These more complex filter embodiments are constructed using an analogous waveguide and polarizers as before except that the polarizers here are designated as 60,62,64, and 66. Each successive stage sees as its input polarizer the previous stage's output polarizer. The total response of the filter is the product of the responses of the individual stages. The cascaded stages are chosen to yield the net filter response desired.

Figure 9:
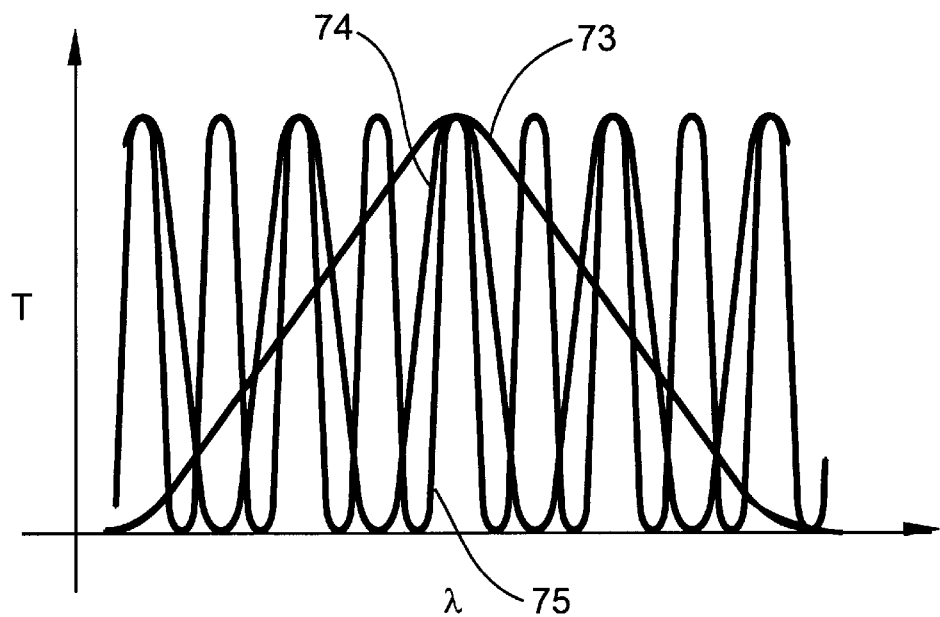
FIG. 9 is a graph illustrating the filtering characteristics of the various stages of the embodiment of FIG. 8 shown individually.
Figure 10:
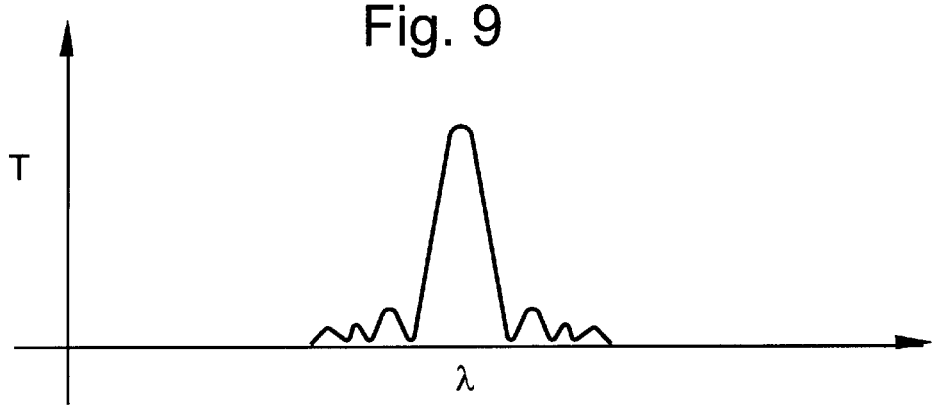
FIG. 10 is a graph illustrating the filtering characteristics of the combined stages of the embodiment of FIG. 8.

FIG. 9 shows on the same plot the responses of three stage lengths 68, 70 and 72 of FIG. 8 where the lengths are chosen as a binary series. The longest stage length 68 corresponds with the tightest grouped response 75 and the shortest length 72 corresponds to the widest response 73. Curve 74 is the intermediate length stage response. FIG. 10 shows the net response, or the product of the responses in FIG. 9 The individual stages can be designed and combined in an infinite number of different combinations to yield the response desired. The lengths do not have to be in binary series.

Tuning is performed using the same techniques as in a single stage where either the excitation is applied uniformly across all stages of the device, a technique advantageous in some applications, or as independent excitations on each of the stages.

Preferred material systems for fabrication of the waveguides have large crystalline birefringence in the propagation direction. Further, large birefringence tuning coefficients are advantageous for tuning. Numerous crystalline and non-crystalline materials, cut in preferential directions, are available for construction of the embodiments of the invention and include, but are not limited to, those found in *Optical Waves in Crystals*, Yariv, Amnon and Yeh, Pochi, John Wiley and Sons, p 85 (1989) and in U.S. Pat. No. 4,197,008 issued to Pinnow, et al. on Apr. 8, 1980 in columns 11, 12, and 13, both of which are incorporated herein by reference as examples of suitable materials.

The preferred material is lithium niobate due to the mature state of the waveguide fabrication technology, the large thermal, electro, and acousto optical coefficients. As an example of a practical design with lithium niobate, the birefringence, Δn, is approximately 0.08 for X-cut lithium niobate. Using the foregoing equation for FWHM, the path length difference needed for a 1 nm FWHM at 1550 nm (a standard communication wavelength) is $1.2 \times 10^6$ nm. Therefore, d, the stage length is 0.5 cm. This defines the longest stage, with the shortest stage length=$d/n^2$, if n is the number of stages. The free spectral range is FSR= FWHM*$n^2$. Assuming the first stage (the longest) is 2 cm and the shortest 2.5 um, a filter with 10 stages can easily be manufactured on a standard 5 cm crystal.

Figure 11:
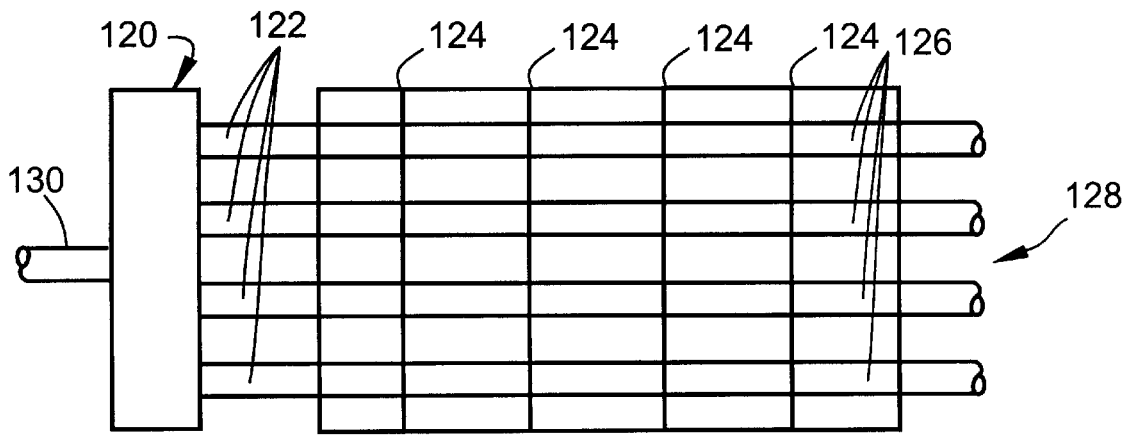
FIG. 11 is a diagrammatic planar view of an embodiment of the invention having a plurality of waveguides arranged aside of one another for parallel filtering applications.

Referring to FIG. 11, there is shown an embodiment of the invention showing stages integrated in massively parallel fashion, where a number N of parallel filters or channels are monolithically fabricated on one substrate. The uniformity in device to device performance is greatly improved using the fabrication techniques set forth herein. The substrate here is patterned with N waveguides, 126, as outlined above, and polarizers 124 are mounted across all waveguides 126 to set the spectral properties of the filter. If the properties of the filter are required to vary from one channel to another, the polarizer spacings are made different for each channel. A series of input fibers 122 and output fibers 128 are attached to the device in a similar fashion as that for the single channel device. The input fibers 122 are attached to a 1×N optical splitter 120. An input 130 is attached in the usual way to the optical splitter 120 and in turn is attached upstream to the source of interest. In this fashion, the incoming light is split by the 1×N splitter 120 into the N input fibers, each channel receiving 1/N of the light through it's corresponding input fiber, and filtered by the corresponding one of the filter of that channel. The light then exits the channel in a corresponding output fibers 128.

Figure 12:
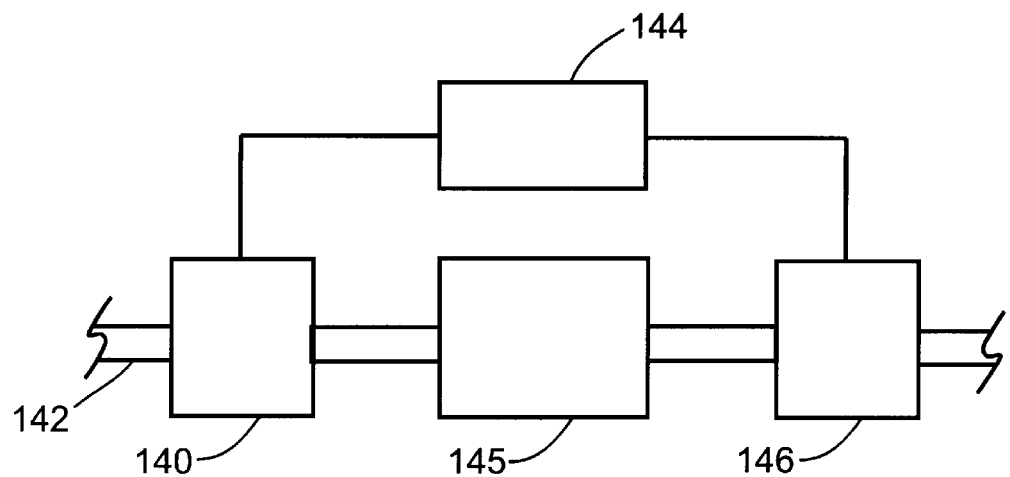
FIG. 12 is a diagrammatic planar view of an embodiment of the invention showing its use with an upstream polarization controller and a downstream detection and feedback system.

The embodiments of the invention described so far are inherently polarization sensitive, which limits the applications of the invention. However, FIG. 12 shows an architecture which compensates for this polarization sensitivity. Here, a polarization controller 140 is inserted upstream of an IOTF 145 of the invention. A photodetector 146 monitors the output of the IOTF 145 and feeds the information to a controller 144. The controller 144 readjusts the polarization controller 140 to maximize the output of the filter.

Figure 13:
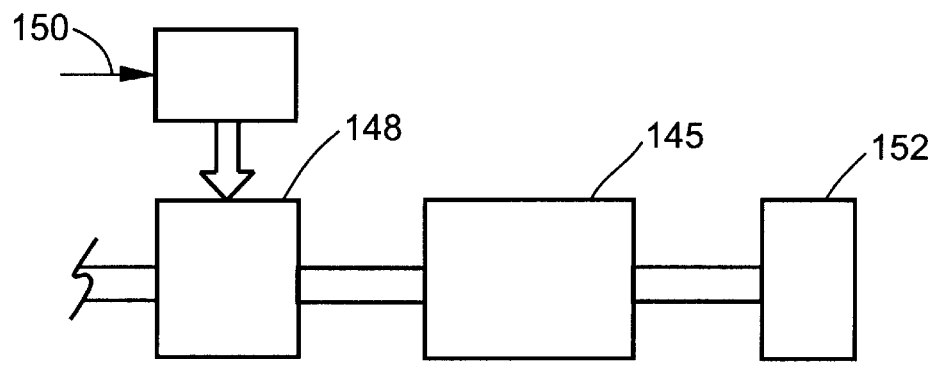
FIG. 13 is a diagrammatic planar view of another polarization controller embodiment of the invention.

FIG. 13 shows a similar scheme where the polarization controller 148 is driven by a high frequency driver 150 which causes the input polarization state seen by the invention to vary faster than the sampling time of the electronics 152 at the output of the filter. The signal obtained in the sample time, T, has seen all polarization states and averages the value.

Figure 14:
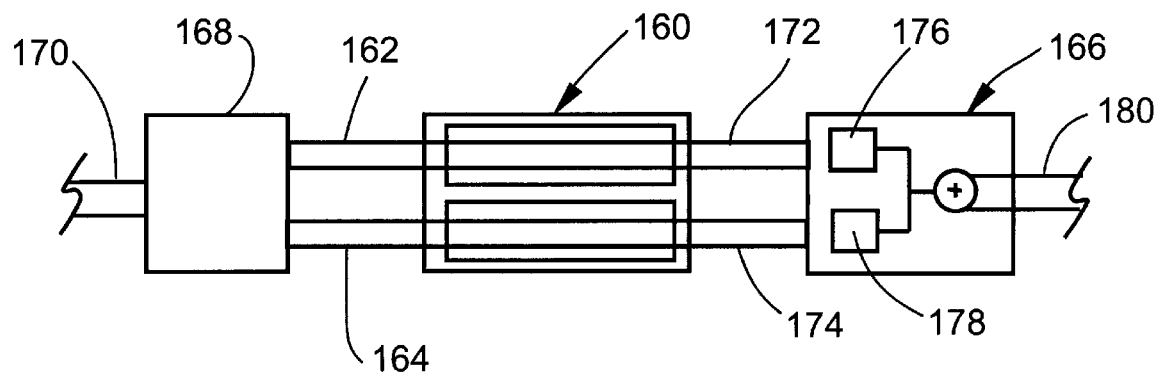
FIG. 14 is a diagrammatic planar view of a multichannel embodiment of the invention shown in combination with an upstream polarization splitter, followed by polarization control means in the form of aligned polarization fibers, and downstream detection means.

FIG. 14 shows an architecture which solves the polarization sensitivity problem in a different way. A two channel device 160 with each channel having identical spectral properties is fabricated in the usual way. Since the devices are monolithic, the filters are very well matched. A polarization splitter 168 is inserted upstream from the two channel device 160 with an input 170 to the splitter 168 connected to the source of interest. Polarized outputs 162, 164 (PM fiber) are connected with the polarizing axis of the fiber parallel to the first polarizer of each channel. The signals are then filtered in parallel and exit the invention through fibers 172, 174. Afterwards, they are converted to electrical signals by a receiver 166. The receiver 166 contains two separate photodetectors 176,178 which convert the two channels into electrical signals and then combine them to form an output signal 180. The signals must be combined in the electrical domain because the optoelectronic conversion destroys the phase relationship between the two channels, which would otherwise cause adverse interference effects in the optical domain.

Figure 15:
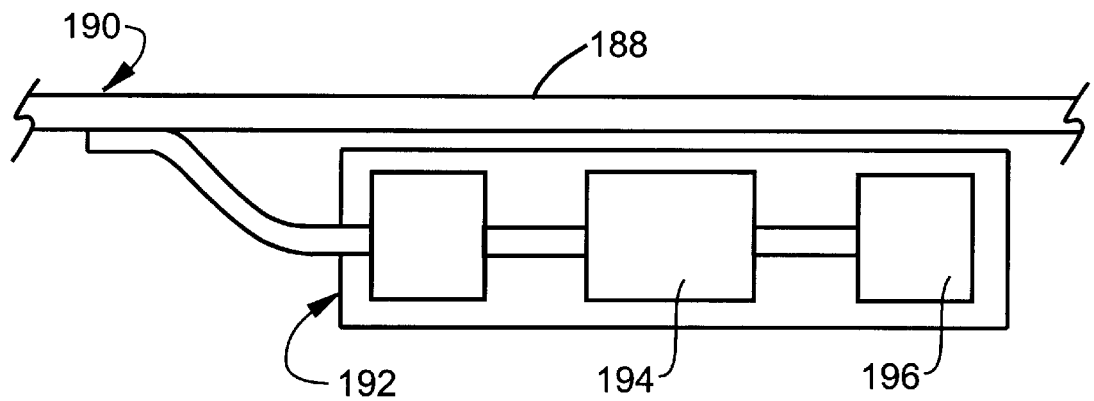
FIG. 15 is a diagrammatic planar view of the use of embodiments of the invention as a component in a fiber optic communications architecture where it derives its input signal from a partial non-dispersive tap coupled to a trunk line.

FIG. 15 shows an architecture which includes the foregoing embodiments as a component of a fiber optic transmission system. An inventive IOTF is coupled to a trunk line 188 via a well-known coupler 190 which couples off a percentage of the optical power. The coupled optical power is then fed into the receiver 192 which comprises an inventive IOTF 194 and components to process the signal for an end user designated at 196. This architecture is extremely important in wavelength division multiplexing (WDM) where the trunk line contains many wavelengths and a specific wavelength is channeled to the end user. The associated method of coupling an inventive IOTF to a trunk line for WDM purposes is considered part of the invention.

Figure 16:
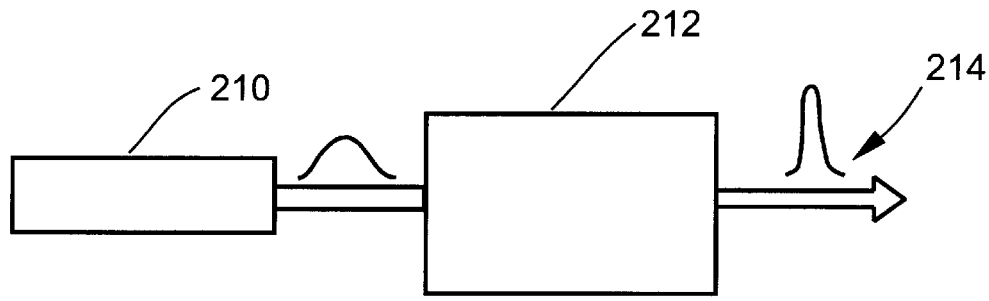
FIG. 16 is a diagrammatic planar view showing the use of an embodiment of the invention with a radiant energy source such as a laser or laser diode to control its output bandwidth.

FIG. 16 shows an inventive IOTF adapted to narrow the line width of a light source 210, which is preferably an LED or laser diode. Here, an inventive IOTF 212 receives the broad band output from source 210 and filters it to provide a substantially narrowed output 214 for subsequent downstream use. FIG. 16 also illustrates that the inventive filters can be used in transmission applications as well as in receiving applications.

There are a number of referencing techniques, which will now be described, for maintaining the calibration of inventive IOTF devices.

Figure 17:
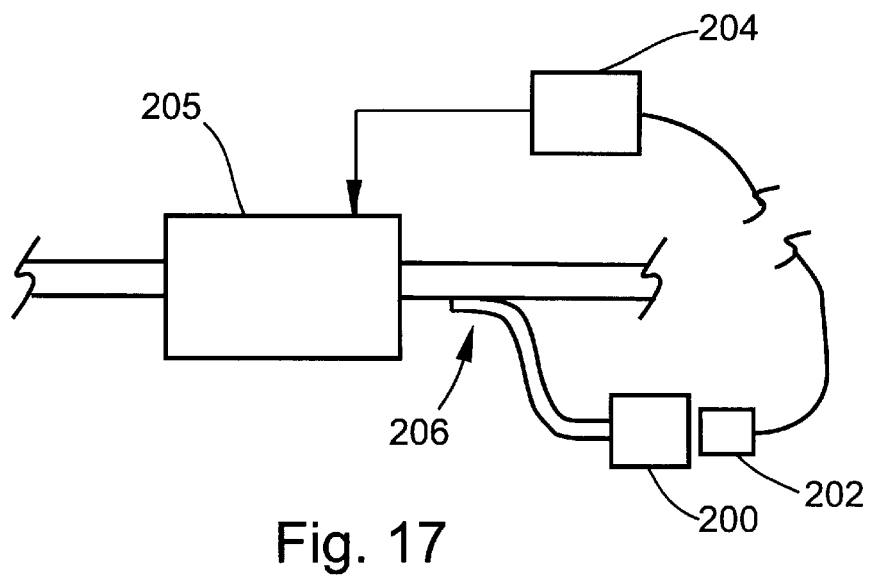
FIG. 17 is a diagrammatic planar view of an inventive IOTF with a tap coupler and feedback arrangement for controlling the calibration of the IOTF.

FIG. 17 shows an IOTF device 205 with a tap coupler 206 on its output to supply a small percentage of the output signal to a reference filter 200 of known passband. A downstream photodetector 202 generates a signal which is fed back to a filter drive 204 and used to identify the passband of the filter. At a specified interval, the controller 204 can scan the IOTF device 205 at a known rate while monitoring the reference filter 200 and thereby calibrate IOTF device 205.

The configurations to be described are based on adding a structure monolithically to an IOTF device to monitor the on device properties. This assumes the distance between the monitor and device are small. The filter is calibrated once and then an optical feedback is used to reference.

Figure 18:
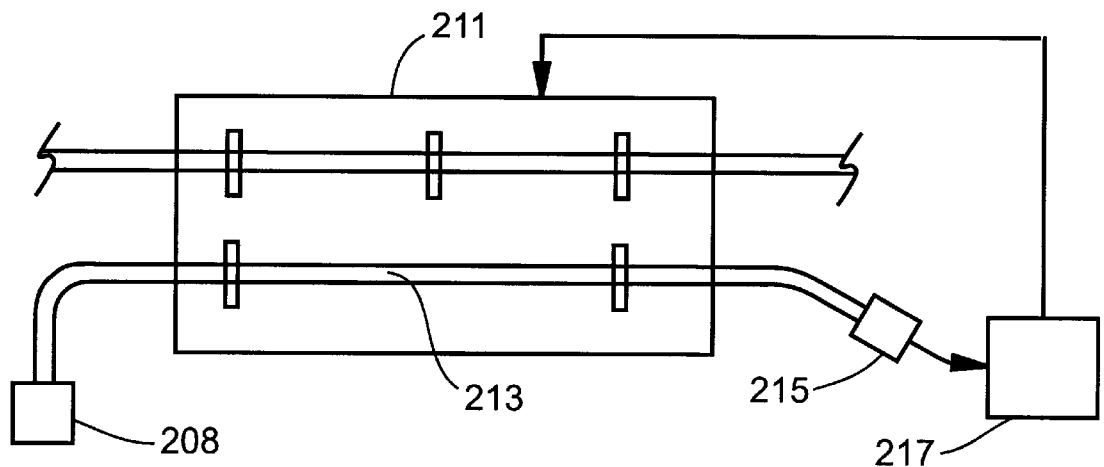
FIG. 18 is a diagrammatic planar view of an inventive IOTF in combination with a non-intrusive feedback arrangement for controller the calibration of the IOTF.

FIG. 18 shows an IOTF 211 fabricated with another surrogate waveguide channel 213 to be used only for referencing. A source 208 is coupled to the input and a detector 215 to the output. The detector information is used by a controller 217 to maintain the calibration of IOTF device 211. This method has the great advantage of being non-intrusive to the signal path.

Figure 19:
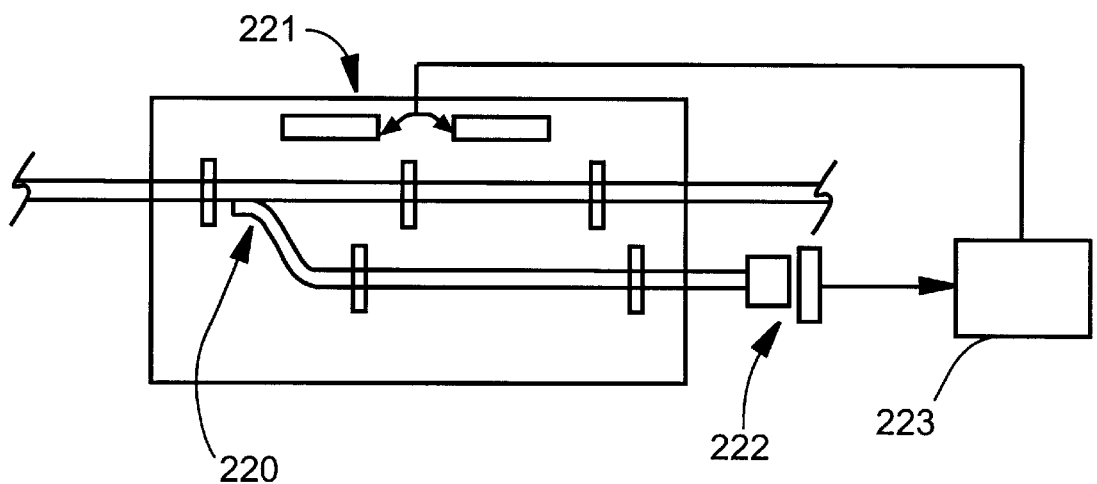
FIG. 19 is yet another diagrammatic planar view of a feedback arrangement for controlling the calibration of an inventive IOTF.

FIG. 19 shows a configuration similar to that in FIG. 18, but with the addition of an on chip evanescent coupler 220 (easily made by someone skilled in the art) to an IOTF device indicated generally at 221. Coupled light is sent into either a reference filter 222 or a single stage and monitored. A filter controller 223 provides feedback to device 221 to maintain its calibration. Coupler 220 can be anywhere on the chip.

Although the invention was described with reference to specific applications and devices, those skilled in the art will recognize that there are other possible applications based on the described embodiments and principles of operation of the invention. For example, it will be readily apparent that in multistage filters, sections may be duplicated to further narrow signals through the elimination of side bands since small signal levels in the side bands are being multiplied successively by small filter factors. It will also be readily apparent that organic/polymeric materials exhibiting birefringence and electro-optic activity may be beneficially used to practice the invention. Examples of suitable polymeric materials include, but are not limited to, 2-Methyl-4-nitroaniline, m-Nitroaniline, and (dimethylamino) mitrostilbene. Well-known photopolymerization techniques may be used to form the required waveguides in such materials. It is therefore intended that all such variations fall within the scope of the invention.

What is claimed is:

1. An integrated optic wavelength selective filter, said filter comprising:

a substrate formed of a birefringent material;

a least one waveguide formed in said substrate with an input end and an output end, said waveguide having a predetermined length and geometry and structured in said substrate to support at least two orthogonally polarized modes of propagation along said predetermined length such that the spatial energy profiles of said orthogonally polarized modes of propagation are substantially identical as they exit said output end, said waveguide being formed in said substrate along an axis thereof such that said orthogonally polarized modes of propagation experience different effective indices of refraction and thus rates of change as they propagate along said waveguide;

input polarizer means positioned upstream of said input end of said waveguide with an axis of polarization at a predetermined angular orientation with respect to said waveguide;

output polarizer means positioned downstream of said output end of said waveguide with an axis of polarization at a predetermined angular orientation with respect to that of said input polarizer means; and means for coupling an input signal containing a plurality of wavelengths into said waveguide through said input polarizer means so that said input signal is analyzed into polarized components corresponding to said orthogonal modes of propagation and propagate along said waveguide such that each wavelength of said input experiences a different phase change as it travel along said waveguide, said predetermined length of said waveguide being selected so that the phase relationship between predetermined wavelengths of said orthogonally polarized modes of propagation, within a given bandwidth, constructively interfere with one another along the axis of said output polarizer means so that they are transmitted thereby for subsequent downstream use while all other wavelengths destructively interfere so that they are rejected from subsequent downstream use.

2. The filter of claim 1 wherein at least one of said input and output polarizer means comprises a linear polarizer.

3. The filter of claim 2 wherein both of said input and output polarizer means is a linear polarizer.

4. The filter of claim 1 wherein said birefringent material is selected from the group consisting of birefringent optical crystals, birefringent polymers, and initially nonbirefringent materials rendered birefringent by the process by which they are fabricated.

5. The filter of claim 4 wherein said birefringent optical crystals include uniaxial and biaxial crystals.

6. The filter of claim 4 wherein birefringent optical crystals comprise lithium niobate and lithium tantalate.

7. The filter of claim 6 wherein said uniaxial birefringent optical crystals comprise y-cut, x-propagating and x-cut, y-propagating crystals.

8. The filter of claim 4 wherein said birefringent polymers comprise 2-Methyl-4-nitroaniline, m-Nitroaniline, and (dimethylamino) mitrostilbene.

9. The filter of claim 4 wherein initially non birefringent materials comprise optical glass treated via ion exchange.

10. The filter of claim 1 wherein said birefringent material is optically active having optical properties that may be changed in the presence of at least one form of external stimulus.

11. The filter of claim 10 wherein said external stimulus includes acoustic fields, electric fields, heat, and mechanical stress.

12. The filter of claim 10 further including means for applying said external stimulus for selectively changing the optical properties of said waveguide to selectively tune said filter.

13. The filter of claim 12 wherein said means for applying said external stimulus comprises electrodes arranged with respect to said waveguide to subject said waveguide with an electric field.

14. The filter of claim 12 further including means for modulating said electric field to rapidly tune said filter among different ones of said bandwidths.

15. The filter of claim 1 further including a plurality of waveguides formed in said substrate aside of one another, each one of said plurality of waveguides having a different predetermined length and geometry such that each waveguide in conjunction with input and output polarizing means and operates to filter a different bandwidth within said input signal.

16. The filter of claim 15 further including a trunk line for carrying said input signal and a 1×N splitter coupled to trunk line for splitting said input signal into a plurality of signals for feeding each one of said plurality of waveguides.

17. The filter of claim 1 further including a trunk line for carrying a trunk signal and a tap coupled between said trunk line and said filter, said tap being structured to divert a part of said trunk signal via said tap to provide said input signal to said filter.

18. The filter of claim 1 further including a radiant energy source of known bandwidth coupled to said filter to provide said input signal, said filter operating to reduce said known bandwidth to narrow it to predetermined limits.

19. The filter of claim 1 wherein said waveguide is formed in said substrate via a process selected from the group consisting of ion exchange, field assisted ion-exchange, and ion implantation.

20. The filter of claim 19 wherein said birefringent material comprises lithium niobate and said waveguide is formed therein by a proton exchange process.

21. An integrated optic wavelength selective filter, said filter comprising:

a substrate formed of a birefringent material;

a least one waveguide formed in said substrate with an input end and an exit end, said waveguide having a predetermined length and geometry and structured in said substrate to support at least two orthogonally polarized modes of propagation along said predetermined length such that the spatial energy profiles of said orthogonally polarized modes of propagation are substantially identical as they exit said output end, said waveguide being formed in said substrate along an axis thereof such that said orthogonally polarized modes of propagation experience different effective indices of refraction and thus rates of change as they propagate along said waveguide, said waveguide being divided into stages each of which is a different length and has an output end, the output end of a prior stage serving as the input end of a succeeding stage;

input polarizer means positioned upstream of said input end of said waveguide with an axis of polarization at a predetermined angular orientation with respect to said waveguide;

output polarizer means positioned downstream of each of said output ends of said stages and said exit end of said waveguide, each of said output polarizer means having an axis of polarization at a predetermined angular orientation with respect to that of said input polarizer means and means for coupling an input signal containing a plurality of wavelengths into said waveguide through said input polarizer means so that said input signal is analyzed into polarized components at each stage of said waveguide corresponding to said orthogonal modes of propagation and propagate along each said stage of said waveguide such that each wavelength of said input experiences a different phase change as it travel along said waveguide through successive stages of said filter, said predetermined length of each of said stages of said waveguide being selected so that the phase relationship between predetermined wavelengths of said orthogonally polarized modes of propagation, within a different given bandwidths for each stage, constructively interfere with one another along the axis of each of said output polarizer means so that they are transmitted thereby for subsequent downstream use, while all other wavelengths destructively interfere so that they are rejected from subsequent downstream use, said stages of said waveguide acting in conjunction with one another to provide an output bandwidth that is a combination of said different given bandwidths of each of said stages.

22. The filter of claim 21 wherein the lengths of each of said stages of said filter differ from one another by a factor of 2N, where N is and integer.

23. The filter of claim 22 wherein at least two of said stages have nominally the same length to sharpen the wavelength selective response of said filter.

24. The filter of claim 23 wherein at least two of said stages have nominally the same length to sharpen the wavelength selective response of said filter.

25. The filter of claim 21 wherein at least one of said input and exit polarizer means comprises a linear polarizer.

26. The filter of claim 21 wherein both of said input and exit polarizer means is a linear polarizer.

27. The filter of claim 21 wherein all of said polarizer means thereof comprise linear polarizers.

28. The filter of claim 21 wherein said birefringent material is selected from the group consisting of birefringent optical crystals, birefringent polymers, and initially nonbirefringent materials rendered birefringent by the process by which they are fabricated.

29. The filter of claim 28 wherein said birefringent optical crystals include uniaxial and biaxial crystals.

30. The filter of claim 29 wherein birefringent optical crystals comprise lithium niobate and lithium tantalate.

31. The filter of claim 29 wherein said uniaxial birefringent optical crystals comprise y-cut, x-propagating and x-cut, y-propagating crystals.

32. The filter of claim 28 wherein said birefringent polymers comprise 2-Methyl-4-nitroaniline, m-Nitroaniline, and (dimethylamino) mitrostilbene.

33. The filter of claim 28 wherein initially non birefringent materials comprise optical glass treated via ion exchange.

34. The filter of claim 21 wherein said birefringent material is optically active having optical properties that may be changed in the presence of at least one form of external stimulus.

35. The filter of claim 34 wherein said external stimulus includes acoustic fields, electric fields, heat, and mechanical stress.

36. The filter of claim 35 further including means for applying said external stimulus for selectively changing the optical properties of said waveguide to selectively tune said filter.

37. The filter of claim 36 wherein said means for applying said external stimulus comprises electrodes arranged with respect to said waveguide to subject said waveguide with an electric field.

38. The filter of claim 37 further including means for modulating said electric field to rapidly tune said filter among different ones of said bandwidths.

39. The filter of claim 36 wherein said means for applying said external stimulus is structured and arranged with respect to said waveguide so that each stage of said waveguide is uniformly acted upon by an externally applied stimulus.

40. The filter of claim 39 wherein said means for applying said external stimulus is structured and arranged with respect to said waveguide so that at least two stages of said waveguide have different stimuli applied to them to individually tune them.

41. The filter of claim 21 further including a plurality of waveguides formed in said substrate aside of one another, each one of said plurality of waveguides having a different predetermined length and geometry such that each waveguide in conjunction with input and output polarizing means and operates to filter a different bandwidth within said input signal.

42. The filter of claim 41 further including a trunk line for carrying said input signal and a 1×N splitter coupled to trunk line for splitting said input signal into a plurality of signals for feeding each one of said plurality of waveguides.

43. The filter of claim 21 further including a trunk line for carrying a trunk signal and a tap coupled between said trunk line and said filter, said tap being structured to divert a part of said trunk signal via said tap to provide said input signal to said filter.

44. The filter of claim 21 further including a radiant energy source of known bandwidth coupled to said filter to provide said input signal, said filter operating to reduce said known bandwidth to narrow it to predetermined limits.

45. The filter of claim 21 wherein said waveguide is formed in said substrate via a process selected from the group consisting of ion exchange, field assisted ion-exchange, and ion implantation.

46. The filter of claim 45 wherein said birefringent material comprises lithium niobate and said waveguide is formed therein by a proton exchange process.

47. The filter of claim 21 wherein said input polarizer means comprises a polarization controller for selectively aligning the polarization state of said input signal with respect to said waveguide.

48. The filter of claim 47 further including feedback means for analyzing the output signal from said filter and providing a feedback signal to said polarization controller for optimizing the output signal from said filter.

49. The filter of claim 42 further including polarization controller means located intermediate said splitter for individually controlling the state of polarization of each part of said input signal to each of said waveguides.

50. A method for fabricating an integrated optic wavelength selective filter, said method comprising the steps of:
providing a substrate formed of a birefringent material;
forming a least one waveguide in said substrate with an input end and an exit end, said waveguide having a predetermined length and geometry and structured in said substrate to support at least two orthogonally polarized modes of propagation along said predetermined length such that the spatial energy profiles of said orthogonally polarized modes of propagation are substantially identical as they exit said output end, said waveguide being formed in said substrate along an axis thereof such that said orthogonally polarized modes of propagation experience different effective indices of refraction and thus rates of change as they propagate along said waveguide, said waveguide being divided into stages each of which is a different length and has an output end, the output end of a prior stage serving as the input end of a succeeding stage;
positioning input polarizer means upstream of said input end of said waveguide with an axis of polarization at a predetermined angular orientation with respect to said waveguide;
positioning output polarizer means downstream of each of said output ends of said stages and said exit end of said waveguide, each of said output polarizer means having an axis of polarization at a predetermined angular orientation with respect to that of said input polarizer means and
forming means for coupling an input signal containing a plurality of wavelengths into said waveguide through said input polarizer means so that said input signal is analyzed into polarized components at each stage of said waveguide corresponding to said orthogonal modes of propagation and propagate along each said stage of said waveguide such that each wavelength of said input experiences a different phase change as it travel along said waveguide through successive stages of said filter, said predetermined length of each of said stages of said waveguide being selected so that the phase relationship between predetermined wavelengths of said orthogonally polarized modes of propagation, within a different given bandwidths for each stage, constructively interfere with one another along the axis of each of said output polarizer means so that they are transmitted thereby for subsequent downstream use, while all other wavelengths destructively interfere so that they are rejected from subsequent downstream use, said stages of said waveguide acting in conjunction with one another to provide an output bandwidth that is a combination of said different given bandwidths of each of said stages.

51. The method of claim 50 wherein the lengths of each of said stages of said filter differ from one another by a factor of 2N, where N is and integer.

52. The method of claim 50 wherein at least two of said stages have nominally the same length to sharpen the wavelength selective response of said filter.

53. The method of claim 52 wherein at least two of said stages have nominally the same length to sharpen the wavelength selective response of said filter.

54. The method of claim 50 wherein at least one of said input and exit polarizer means comprises a linear polarizer.

55. The method of claim 50 wherein both of said input and exit polarizer means is a linear polarizer.

56. The method of claim 50 wherein all of said polarizer means thereof comprise linear polarizers.

57. The method of claim 50 wherein said birefringent material is selected from the group consisting of birefringent optical crystals, birefringent polymers, and initially nonbirefringent materials rendered birefringent by the process by which they are fabricated.

58. The method of claim 57 wherein said birefringent optical crystals include uniaxial and biaxial crystals.

59. The method of claim 58 wherein birefringent optical crystals comprise lithium niobate and lithium tantalate.

60. The method of claim 58 wherein said uniaxial birefringent optical crystals comprise y-cut, x-propagating and x-cut, y-propagating crystals.

61. The method of claim 57 wherein said birefringent polymers comprise 2-Methyl-4-nitroaniline, m-Nitroaniline, and (dimethylamino) mitrostilbene.

62. The method of claim 57 wherein initially non birefringent materials comprise optical glass treated via ion exchange.

63. The method of claim 50 wherein said birefringent material is optically active having optical properties that may be changed in the presence of at least one form of external stimulus.

64. The method of claim 53 wherein said external stimulus includes acoustic fields, electric fields, heat, and mechanical stress.

65. The method of claim 53 further including the step of applying an external stimulus for selectively changing the optical properties of said waveguide to tune said filter to at least one other bandwidth that is different from said given bandwidth.

66. The method of claim 65 wherein said step of applying said external stimulus comprises arranging electrodes with respect to said waveguide to subject said waveguide with an electric field.

67. The method of claim 66 further including the step of modulating said electric field to rapidly tune said filter among different ones of said bandwidths.

68. The method of claim 65 wherein said step of applying said external stimulus is done with respect to said waveguide so that each stage of said waveguide is uniformly acted upon by an externally applied stimulus.

69. The method of claim 68 wherein said step of applying said external stimulus is done with respect to said waveguide so that at least two stages of said waveguide have different stimuli applied to them to individually tune them.

70. The method of claim 50 wherein said step of forming a waveguide in said substrate includes forming a plurality of waveguides in said substrate aside of one another, each one of said plurality of waveguides having a different predetermined length and geometry such that each waveguide in conjunction with input and output polarizing means and operates to filter a different bandwidth within said input signal.

71. The method of claim 70 further including the step of providing a trunk line for carrying said input signal and a 1×N splitter coupled to said trunk line for splitting said input signal into a plurality of signals for feeding each one of said plurality of waveguides.

72. The method of claim 50 further including the step of providing a trunk line for carrying a trunk signal and forming a tap coupled between said trunk line and said filter, said tap being structured to divert a part of said trunk signal via said tap to provide said input signal to said filter.

73. The method of claim 50 further including coupling a radiant energy source of known bandwidth with said filter to provide said input signal, said filter operating to reduce said known bandwidth to narrow it to predetermined limits.

74. The method of claim 50 wherein the step of forming said waveguide in said substrate is via a process selected from the group consisting of ion exchange, field assisted ion-exchange, and ion implantation.

75. The method of claim 74 wherein said birefringent material comprises lithium niobate and said waveguide is formed therein by a proton exchange process.

76. The method of claim 50 further including providing a polarization controller to control the state of polarization of said input signal prior to its entry into said waveguide.

77. A method for wavelength selective filtering of optical signals, said method comprising the steps of:

providing a substrate formed of a birefringent material;

forming a least one waveguide in said substrate with an input end and an exit end, said waveguide having a predetermined length and geometry and structured in said substrate to support at least two orthogonally polarized modes of propagation along said predetermined length such that the spatial energy profiles of said orthogonally polarized modes of propagation are substantially identical as they exit said output end, said waveguide being formed in said substrate along an axis thereof such that said orthogonally polarized modes of propagation experience different effective indices of refraction and thus rates of change as they propagate along said waveguide, said waveguide being divided into stages each of which is a different length and has an output end, the output end of a prior stage serving as the input end of a succeeding stage;

positioning input polarizer means upstream of said input end of said waveguide with an axis of polarization at a predetermined angular orientation with respect to said waveguide;

positioning output polarizer means downstream of each of said output ends of said stages and said exit end of said waveguide, each of said output polarizer means having an axis of polarization at a predetermined angular orientation with respect to that of said input polarizer means and coupling an input signal containing a plurality of wavelengths into said waveguide through said input polarizer means so that said input signal is analyzed into polarized components at each stage of said waveguide corresponding to said orthogonal modes of propagation and propagate along each said stage of said waveguide such that each wavelength of said input experiences a different phase change as it travel along said waveguide through successive stages of said filter, said predetermined length of each of said stages of said waveguide being selected so that the phase relationship between predetermined wavelengths of said orthogonally polarized modes of propagation, within a different given bandwidths for each stage, constructively interfere with one another along the axis of each of said output polarizer means so that they are transmitted thereby for subsequent downstream use, while all other wavelengths destructively interfere so that they are rejected from subsequent downstream use, said stages of said waveguide acting in conjunction with one another to provide an output bandwidth that is a combination of said different given bandwidths of each of said stages.

78. The method of claim 77 wherein the lengths of each of said stages of said filter differ from one another by a factor of 2N, where N is and integer.

79. The method of claim 77 wherein at least two of said stages have nominally the same length to sharpen the wavelength selective response of said filter.

80. The method of claim 79 wherein at least two of said stages have nominally the same length to sharpen the wavelength selective response of said filter.

81. The method of claim 77 wherein at least one of said input and exit polarizer means comprises a linear polarizer.

82. The method of claim 77 wherein both of said input and exit polarizer means is a linear polarizer.

83. The method of claim 77 wherein all of said polarizer means thereof comprise linear polarizers.

84. The method of claim 77 wherein said birefringent material is selected from the group consisting of birefringent optical crystals, birefringent polymers, and initially nonbirefringent materials rendered birefringent by the process by which they are fabricated.

85. The method of claim 84 wherein said birefringent optical crystals include uniaxial and biaxial crystals.

86. The method of claim 85 wherein birefringent optical crystals comprise lithium niobate and lithium tantalate.

87. The method of claim 85 wherein said uniaxial birefringent optical crystals comprise y-cut, x-propagating and x-cut, y-propagating crystals.

88. The method of claim 84 wherein said birefringent polymers comprise 2-Methyl-4-nitroaniline, m-Nitroaniline, and (dimethylamino) mitrostilbene.

89. The method of claim 84 wherein initially non birefringent materials comprise optical glass treated via ion exchange.

90. The method of claim 77 wherein said birefringent material is optically active having optical properties that may be changed in the presence of at least one form of external stimulus.

91. The method of claim 90 wherein said external stimulus includes acoustic fields, electric fields, heat, and mechanical stress.

92. The method of claim 90 further including the step of applying an external stimulus to said waveguide for selectively changing the optical properties of said waveguide to tune said filter to at least one other bandwidth that is different from said given bandwidth.

93. The method of claim 92 wherein said step of applying said external stimulus comprises arranging electrodes with respect to said waveguide to subject said waveguide with an electric field.

94. The method of claim 93 further including the step of modulating said electric field to rapidly tune said filter among different ones of said bandwidths.

95. The method of claim 92 wherein said step of applying said external stimulus is done with respect to said waveguide so that each stage of said waveguide is uniformly acted upon by an externally applied stimulus.

96. The method of claim 95 wherein said step of applying said external stimulus is done with respect to said waveguide so that at least two stages of said waveguide have different stimuli applied to them to individually tune them.

97. The method of claim 77 the step of forming a waveguide in said substrate comprises forming a plurality of waveguides in said substrate aside of one another, each one of said plurality of waveguides having a different predetermined length and geometry such that each waveguide in conjunction with input and output polarizing means and operates to filter a different bandwidth within said input signal.

98. The method of claim 97 further including the step of providing a trunk line for carrying said input signal and a coupling a 1×N splitter to said trunk line for splitting said input signal into a plurality of signals for feeding each one of said plurality of waveguides.

99. The method of claim 77 further including the step of carrying said input signal on a trunk line and tapping said trunk line to divert a part of said trunk signal to provide said input signal to said filter.

100. The method of claim 77 further including the step of coupling a radiant energy source of known bandwidth to said filter to provide said input signal, said filter operating to reduce said known bandwidth to narrow it to predetermined limits.

101. The method of claim 77 wherein said waveguide is formed in said substrate via a process selected from the group consisting of ion exchange, field assisted ion-exchange, and ion implantation.

102. The method of claim 101 wherein said birefringent material comprises lithium niobate and said waveguide is formed therein by a proton exchange process.

103. The method of claim 77 further including the step of controlling the state of polarization of said input signal prior to its entry into said waveguide.

104. The method of claim 103 further including the step of providing feedback from the output signal of said filter to control the state of polarization of said input signal.

105. The integrated optic wavelength selective filter of claim 12 further including means for monitoring its output and providing a feedback signal to said filter to maintain it in calibration.

106. The integrated optic wavelength selective filter of claim 36 further including means for monitoring its output and providing a feedback signal to said filter to maintain it in calibration.

* * * * *